United States Patent [19]
Ogiso et al.

[11] 3,800,305
[45] Mar. 26, 1974

[54] EXPOSURE INDICATING DEVICE

[75] Inventors: Mitsutoshi Ogiso, Kawasaki; Kiyoshi Takahashi, Tokyo, both of Japan

[73] Assignee: Canon Kabushiki Kaisha, Tokyo, Japan

[22] Filed: Sept. 7, 1972

[21] Appl. No.: 287,016

Related U.S. Application Data
[63] Continuation of Ser. No. 98,488, Dec. 16, 1970, abandoned.

[30] Foreign Application Priority Data
Dec. 27, 1969 Japan.................. 44-451529[U]

[52] U.S. Cl. ............................................. 95/10 CE
[51] Int. Cl. ............................................. G03b 7/00
[58] Field of Search...... 95/10 CE, 10 CT; 315/132, 315/133, 153, 154; 340/378 R

[56] References Cited
UNITED STATES PATENTS

| | | | |
|---|---|---|---|
| 3,397,629 | 8/1968 | Mori et al. ............................ | 95/10 |
| 3,487,263 | 12/1969 | Pahlavan............................ | 315/174 |
| 3,603,799 | 9/1971 | Nobusawa............................ | 95/10 |

*Primary Examiner*—Joseph F. Peters, Jr.
*Assistant Examiner*—Michael L. Gellner
*Attorney, Agent, or Firm*—Toren and McGeady

[57] ABSTRACT

In the device disclosed, a sequence of electronic switches each operates an indicator such as a lamp. Each switch is biased to operate at a higher voltage than the previous switch. The output of a photoconductor is applied to each of the switches. Each switch also receives the outputs of all the previous switches so that the lowest order "on" switch turns off the succeeding switches. According to a preferred embodiment of the invention each switch is a Schmitt trigger.

11 Claims, 2 Drawing Figures

INVENTORS
MITSUTOSHI OGISO
KIYOSHI TAKAHASHI
BY Torem and McGeady
ATTORNEYS

EXPOSURE INDICATING DEVICE

This is a continuation of application Ser. No. 98,488 filed Dec. 16, 1970, now abandoned.

The present invention relates to the exposure indicating device, for a camera or the like, wherein the indication is carried out digitally by means of an illuminator lamp.

In electrical releases for cameras or the like in which the value of diaphragm first is set, and the speed of release or the shutter speed is automatically determined by using a transistor circuit and a time constant circuit, there is no indication of exposure time for general photographing. Such indication of exposure time has been obtained from an indication of a current meter. There exists the unavaoidable problem that devices, which have movable parts like current meter are apt to go out of order. Some cameras indicate only the over-exposure, the under-exposure and the alarm for camera holding or the alarm for blur. It is difficult to indicate the speed of release or the shutter speed.

According to the present invention the weak point of the conventional devices has been eliminated in that the variation of resistance in photoelectric element is digitally indicated by using a plural number of transistor switching circuits and illuminator lamps in such a manner that the exposure time at photographing might clearly be obtained.

Below the present invention is explained referring to the drawings.

Figure 1:
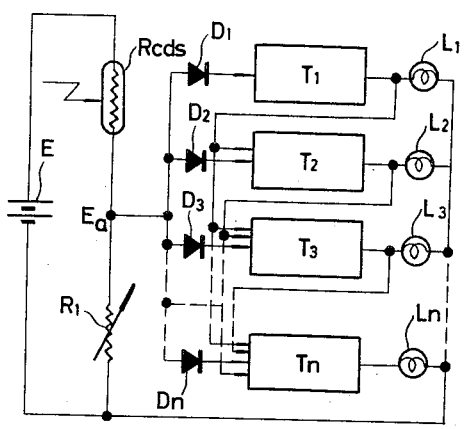
FIG. 1 shows a circuit system to explain the principle of the present invention.

In the drawings, E is an electric source, R$cds$ a photoconductive element (for example CdS which varies its resistance according to the brightness of the light received from the object, $R_1$ a variable resistor which sets up photographic informations such as the value of the diaphragm of a camera, sensitivity of film and so on, $D_1 \ldots D_n$ are respective diodes, $T_1 \ldots T_n$ respectively are transistor switching circuits forming a voltage detecting circuit, and $L_1 \ldots L_n$ respectively are indication lamps. The voltage E$a$ divided by the resistance of the photoconductive element R$cds$ and the set up resistance of the variable resistance $R_1$ is passed through a diode to a voltage detecting circuit. An indication lamp connected to the out-put of circuit indicates voltage E$a$ is indicated. In this case by passing the terminal voltage of each indication lamp to the in-put of the detecting circuit after the next step, only the indication lamp corresponding to the in-put voltage E$a$ lights up to indicate the voltage E$a$ clearly. Further as the detecting circuit, for example a Schmitt-trigger circuit, serves whereby by the setting-up changing operation point one after another the exposure time namely the input voltage is indicated in a digital manner.

Figure 2:
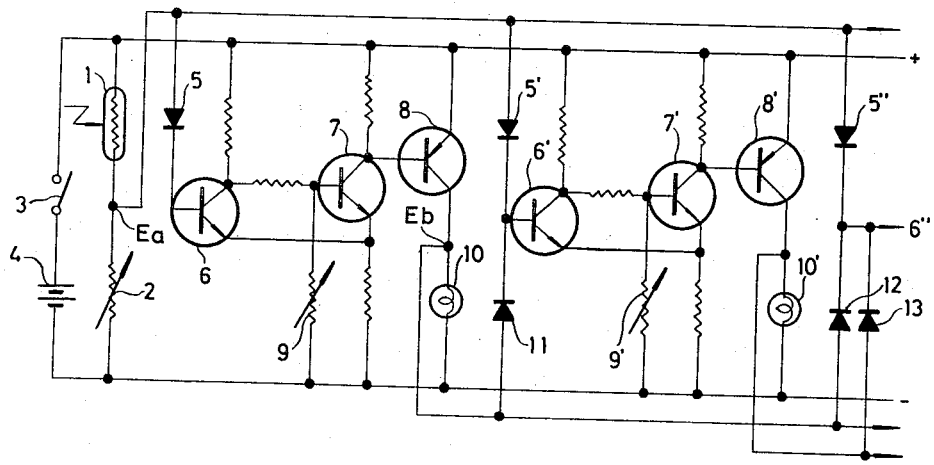
FIG. 2 shows a circuit diagram of an embodiment of an exposure indicating according to the present invention.

FIG. 2 shows a circuit diagram of an embodiment of an exposure time indicating device according to the present invention, whereby only the photoconductive element and the first and second detecting circuit (corresponding to the circuits $T_1$ and $T_2$ of FIG. 1) are shown. In the drawing 1 is a photoconductive element (for example of CdS) which receives the light from the object, 2 a variable resistor which enters photographic informations such as film sensitivity, diaphragm opening and so on, 3 a switch for the electrical source and 4 the electrical source. Members 5 to 10 are the elements forming the voltage detecting circuit of the first step while 5' to 10' the elements forming the voltage detecting circuit of the second step. In other words, 5, 5' and 5'' are respective diodes to supply an input voltage to respective detecting circuit, 6, 7 and 6', 7' respective transistors forming respective Schmitt circuits, 8 and 8' respective amplifying transistors, 9 and 9' respective variable resistors to produce a bias voltage for the respective detecting circuit, 10 and 10' respective indication lamps, 11, 12 and 13 respective diodes to transfer the terminal voltage of the lamp to the input of the detecting circuit of the following step.

The apparatus operates as follows. Let the bias input voltage to the detecting circuit of the first step be $ea$, and the bias input voltage to the detecting circuit of the second step be $eb$. The variable resistors 9 and 9' are adjusted in such a manner that $ea$ is smaller than $eb$ ($ea<eb$). Let the voltage divided by the resistance of the photoconductive element 1 and the resistance established by the variable resistance 2 be E$a$. When E$a$ becomes smaller than $eb$ (E$a<eb$), the transistor 6' of the detecting circuit of the second step is connected, the transistor 7' disconnected and the transistor 8' connected so that the lamp 10' lights up. When E$a$ is larger than $ea$ (E$a>ea$) the transistor 6' is connected, the transistors 7 and 8 disconnected so that the lamp 10 does not light up, from which it is known that E$a$ is an intermediate value of $ea$. When the light received decreases in such a manner that E$a$ becomes smaller than $ea$, both lamps 10 and 10' light up. When the lamp 10 lights up, its terminal voltage E$b$ is applied to the input of the detecting circuit of the second step via the diode 11 in such a manner that the voltage E$b$ − E$a$ is applied to the base of the transistor 6'. When it is adjusted so that E$b$ − E$a$ is greater than $eb$ (E$b$ − E$a>eb$), the detecting circuit of the second step is biased as soon as the lamp 10 lights up so that the lamp 10' does not light up. If it is arranged, as mentioned that the terminal voltage of an indication lamp is applied to the input of the next step, the extent of the light received by the photosensitive element is indicated with a single lamp so that the exposure time can be indicated in a digital way. Thereby the photographic information of camera such as film sensitivity, diaphragm and so on can be set up on the variable resistor 2 in advance. Thus from a lamp the speed of release or the shutter speed can be directly read.

As mentioned above, the exposure indicating device according to the present invention clearly indicates the exposure time of the electrical release or the shutter speed digitally. The device is effective for use in a camera, while the circuit of the device can easily be modified with integrated circuits so that the device can be constructed very compactly for example with photo emissive diodes. Further no part subject to breakdown, like current meter, are used. The device is adapted to be built-in a camera or the like can be constructed according to the present invention at minimum cost.

What is claimed is:

1. An exposure indicating apparatus, comprising photoconductive means, a plurality of switching means and each biased to respond to said photoconductive means to switch from a first condition off to a second condition on in successive order, each of said switching means having an output, a plurality of circuit means each connecting the output of respective ones of said switching means to the inputs of each of the succeeding switching means so as to urge said succeeding switching means to assume the first condition when the one of the switching means is in the second condition, said circuit means each including an indicator and a series connected switch responsive to the condition of the next preceding switching means, said indicator and said switch forming a path of current flow outside the paths of current flow in said switching means; said switching means each including a Schmitt trigger, biased initially to turn said indicating means in said circuit means on, and turned off by the output of said previous circuit means 2. An apparatus as in claim 1, wherein said indicators each includes a lamp, said first condition of said switching means being effective to turn said lamps off.

3. An exposure indicating apparatus, comprising photoconductive means, a plurality of switching means each having an input connected to said photoconductive means and each biased to respond to said photoconductive means to switch from a first condition off to a second condition on in successive order, each of said switching means having an output, a plurality of circuit means each connecting the output of respective ones of said switching means to the inputs of each of the succeeding switching means so as to urge said succeeding switching means to assume the first condition when the one of the switching means is in the second condition, said circuit means each including an indicator and a series connected switch responsive to the condition of the next preceding switching means, said indicator and said switch forming a path of current flow outside the paths of current flow in said switching means and second circuit means connecting said photoconductive means to the inputs of each of said switching means and said first circuit means includes means for forming OR gates with said second circuit means at the inputs of each of said switches.

4. An apparatus as in claim 3, wherein said first circuit means includes a plurality of diodes connected from the output of each of said switching means to all of the inputs of the succeeding switching means, said second circuit means including a plurality of diodes each connecting said photoconductive means to the inputs of said switching means, each of said circuit means including a pair of voltage terminals, one of the terminals in each pair exhibiting a substantially constant voltage sufficient to place said switching means in the second condition, said indicator means each being connected in series with a respective switch and the one of said terminals in the respective one of said circuit means.

5. An apparatus as in claim 4, further comprising housing means for holding said device, said housing means including a camera, said camera including shutter means, said voltage dividing circuit being connected to said shutter means so as to respond to operation of said shutter means so that said indicating devices indicate the shutter speed.

6. A device as in claim 4, wherein said circuit means includes a plurality of diodes connecting the output terminal of each of said switching circuits to the input terminals of all the succeeding switching circuits, said input terminals of said switching circuits each being connected to the output terminal of said voltage dividing circuit by representative diodes, said switching circuits each having a binary switch and a buffer connected to the output of the binary switch, said indicators each forming a series circuit with one of said buffers and forming a path of major current flow with the buffers outside said switch, said diodes being connected between the buffer circuits and the input of the succeeding ones of said binary switches.

7. An exposure indicating apparatus, comprising photoconductive means for providng an output signal in response to the light incident thereon, a plurality of successive Schmitt trigger circuits, each of said circuits including first and second transistors having bases and collectors and interconnected emitters, common emitter resistors connecting the emitters of the transistors in each of said trigger circuits, a plurality of coupling means each including a diode for applying signals corresponding to the voltages at the collectors of each of the second transistors to the bases of the first of said transistors in all of the following trigger circuits, and voltage applicator means for applying the output signal of said photoconductive means to the bases of the first transistors of each of said Schmitt trigger circuits, said coupling means each including an indicating means responsive to the output of the collector of said second transistor in each of said trigger circuits, said coupling means each including a buffer stage coupled to the collector of the second transistor of said transistors in each Schmitt trigger and being rendered conductive according to the state of conduction of the second transistor of said transistors, said buffer stages each having a path of major current flow, said coupling means each having an indicator series connected with said buffer stage and forming a current flow outside of said Schmitt trigger, said coupling means each including a pair of voltage terminals, one of the terminals in each pair exhibiting a substantially constant voltage sufficient to place subsequent switching means in a condition in which subsequent indicators are turned on, said indicators being connected to the one of said terminals in respective ones of said circuit means.

8. An apparatus as in claim 7, further comprising housing means for holding said device, said housing means including a camera.

9. An apparatus as in claim 8, wherein said camera includes a shutter means, said voltage dividing circuit being connected to said shutter means so as to respond to operation of said shutter means so that the indicating devices indicate the shutter speed.

10. An exposure indicating device as in claim 7, wherein said voltage dividing circuit further includes a variable resistor connected in series with said photoconductive element.

11. An apparatus as in claim 7, wherein said coupling means includes respective diodes each connected to the bases of one of said first transistors.

* * * * *